Dec. 29, 1925.                                                         1,567,616
O. RABE
HIGH TEMPERATURE ALARM FOR INTERNAL COMBUSTION ENGINES
Filed April 16, 1923

Inventor;
Otto Rabe,
by

Patented Dec. 29, 1925.

1,567,616

UNITED STATES PATENT OFFICE.

OTTO RABE, OF WILMETTE, ILLINOIS.

HIGH-TEMPERATURE ALARM FOR INTERNAL-COMBUSTION ENGINES.

Application filed April 16, 1923. Serial No. 632,560.

*To all whom it may concern:*

Be it known that I, OTTO RABE, a citizen of the United States, residing at Wilmette, in the county of Cook and State of Illinois, have invented certain new and useful Improvements in High-Temperature Alarms for Internal-Combustion Engines, of which the following is a specification.

This invention has to do with certain improvements in high temperature alarms for internal combustion engines. The invention relates to improvements in high temperature alarms for internal combustion engines used for the propulsion of motor vehicles such as automobiles, trucks, tractors, and the like, which are driven by internal combustion engines; but it will presently appear that the device can also be used to advantage in connection with internal combustion engines for other purposes.

More particularly the invention relates to certain improvements in an alarm for use in connection with the cooling medium which is used in jacketed internal combustion engines. Still more particularly, the alarm of the present invention is so constructed as to give an audible signal when the temperature of the cooling water, for example, exceeds a certain point.

The audible alarm to which the present application particularly relates may be used in conjunction with the cooling liquid of the jacket in any desired manner, provided that the device be subject to changes of temperature with the temperature changes which take place in the jacket medium. For example, this device can be used in such a manner as to be subject either to the exact temperature of the jacketing medium itself or to the temperature of the air or steam within an enclosed space above the jacketing medium.

In some cases the device of the present invention may also be used for indicating an excessive temperature in the cylinder walls themselves even when said cylinder walls are not provided with any jacketing medium for cooling purposes. In such case the device can be used, for example, for indicating an excessive temperature in the cylinder walls of an air cooled engine.

The main object of the present invention is to provide an alarm or signal device which shall operate very accurately at the desired temperature range where the signal is to be given, notwithstanding the fact that the said temperature range may be considerably above the normal temperature of the surrounding atmosphere.

In connection with the foregoing, a further object of the invention is to provide an arrangement such that a very long thermal element may be used, said thermal element being so shaped that it can be brought into a very small amount of space.

A further object of the invention is to so arrange the construction that the thermal element will operate to give a rotary movement to the stripping device by a direct operation, and without the need of using any longitudinal movement of a thermal element afterwards converted into a rotary movement.

In connection with the foregoing, a still further object of the invention is to provide a construction such that the thermal element together with the actuating device, which connects the same with the signal mechanism, may be removed or inserted as a unit and without the necessity of interfering with the construction and operation of the other parts of the device. This will make it possible to insert or remove or adjust the thermal element itself together with the connection to the signal mechanism without having to disassemble the entire device, and also with a great reduction and saving in the amount of labor and cost of the same.

A further benefit derived from this arrangement is that the cost of manufacture is considerably reduced and also the various parts can be assembled or adjusted in the hands of the user without difficulty, if necessary.

Other objects and uses of the invention will appear from a detailed description of the same, which consists in the features of construction and combinations of parts hereinafter described and claimed.

Figure 1:
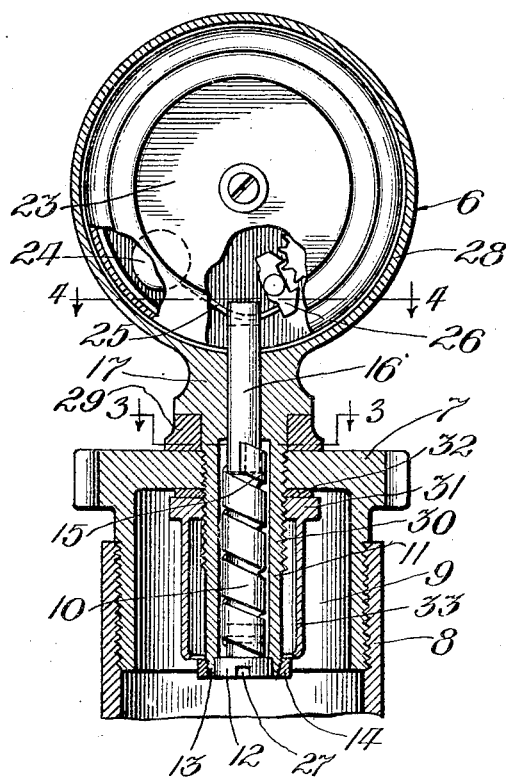
Figure 1 shows a longitudinal section through an alarm device embodying the features of the present invention, the same being applied to the radiator cap of a motor vehicle, so that the thermal element is subject to the temperature existing within the air space above the water within the radiator of the motor vehicle.
Figure 4:
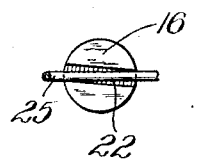
Figure 5:
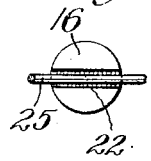

Fig. 4 is a fragmentary section on the line 4—4 of Fig. 1, looking in the direction of the arrows, the thermal element being in the normal position in which the operation of the signal or alarm is interfered with; and Fig. 5 is a view similar to that of Fig. 4, with the exception that the thermal element has been turned due to rise of temperature so as to disengage the alarm device and allow the same to function.

The particular construction shown in the drawing includes an alarm device designated in its entirety by the numeral 6, which, in the present instance, is adapted to give an audible signal as by the ringing of a bell or the like. Furthermore, the signal device, as herein illustrated, is shown as being mounted upon the radiator cap 7 which threads into the neck 8 of an automobile radiator, so that the signal device will be operated by the temperature existing within the air space 9 above the water in the radiator. I wish it distinctly understood, however, that in showing this particular application of the invention, I do not intend thereby to limit its use to the influence of the temperature within the air space above the water, since manifestly, as far as the signal device itself is concerned, it can be used in any convenient manner or combination.

Figure 2:
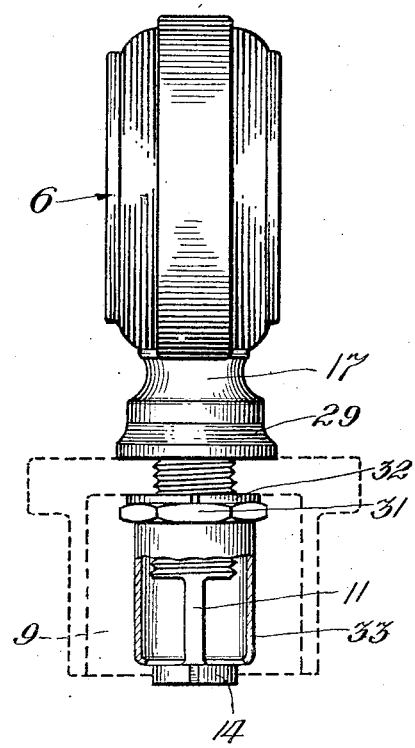
Fig. 2 is a view at right angles to that of Fig. 1.

The signal device and thermal element 10 which is preferably mounted within a bracket or open shell 11, the sides of which are cut away, as shown in Fig. 2, so that the thermal element itself is directly subjected to the temperature of the medium which is to be measured.

The lower portion of the thermal element is rigidly connected to the plug 12 which sets into a socket in the lower end 13 of the bracket 11. The lower end of the bracket may be clamped against the plug 12 by the use of a sleeve 14 which is threaded onto the lower end 13 with a taper thread, so that when the sleeve 14 is tightened up, the lower end 13 will grip the plug 12 and prevent it from turning. The arrangement is such that rotation of the plug 12 will turn the thermal element bodily. The clamping effect on the plug 12 may be secured by squeezing the lower end 13 of the bracket 11 or in any other suitable manner.

The thermal element itself is preferably formed of a relatively narrow thin strip of metal which has a high temperature co-efficient of expansion; and, in fact, it may be desirable in some cases to use a compound strip of two metals having different co-efficients of expansion, so that as the temperature rises the strip bends. On account of the great length of the strip (made possible within a relatively small space by the spiral element), the upper end 15 of the strip will be subjected to a very considerable change of position with a relatively small change of temperature.

Furthermore, by reason of the spiral form of the thermal strip, changes of temperature will result in a rotary or turning movement at its upper end 15, as distinguished from a direct up and down thrust, and by using a strip of considerable length twisted into a number of convolutions (four in the case illustrated in Fig. 1), it is possible to secure a very substantial change of angular position of the upper end 15 of the strip with a relatively small change of temperature. Owing to the fact that the lower end of the strip is anchored by anchoring the plug 12, it follows that all of the rotary movement produced by change of temperature is concentrated at the upper end 15.

Figure 3:
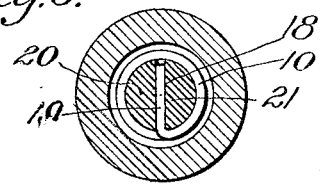
Fig. 3 is a detailed cross section taken on the line 3—3 of Fig. 1, looking in the direction of the arrows.

I make use of the rotary movement of the upper end 15 for the purpose of tripping the signal device when the temperature reaches the critical point. The construction illustrated in the present case is as follows: A plug 16 is rotatably mounted in the base portion 17 of the signal device, the lower end of the plug 16 being slotted, as shown at 18 in Fig. 3, so as to receive the extreme end portion 19 of the thermal strip. The two sides 20 and 21 of the slotted portion of the plug 16 may be clamped firmly against the end 19 of the thermal element in order to cause the plug 16 to respond exactly to changes of angular positions of the upper end of the thermal element.

The extreme upper end of the plug 16 is slotted as shown at 22 in Figs. 4 and 5. The alarm device of the construction illustrated in the drawing includes a bell 23 which is adapted to be struck by the hammer 24 carried by the finger 25 which can be operated by a Swiss movement 26, or in any other convenient manner. The arm 25 is received in the slot 22 of the plug 16. When the plug is turned into the position of Fig. 5, the slot 22 allows free movement of the arm 25, so that the signal is given, but at other times the arm 25 is held by a binding action, due to the fact that the plug 16 is not turned into the proper position.

Normally, the plug 16 is held in such position as to bind the arm 25 and prevent it from moving, as shown in Fig. 4. When the temperature reaches the point at which the signal is to be given, the upper end of the thermal element has been twisted around so as to turn the plug 16 a sufficient amount to disengage the arm 25 and allow the signal to be given.

It will be noted that with the arrangement herein disclosed, it is possible to insert or remove the thermal element together with the plug 16 at its upper end, and the plug 12 at its lower end by direct application upwardly through the bracket 11. Consequently, in order to insert or remove the thermal element together with the plug 16 it is only necessary to loosen up the sleeve 14. It is unnecessary with this construction to either solder or unsolder any parts, and the necessary changes or adjustments can, therefore, be made in a very simple manner.

The temperature at which the alarm device will be released, can be regulated by turning the plug 12 within the lower portion 13 of the bracket 11, since this will alter the temperature at which the angular position of the slot 22 will disengage from the signal device. The plug 12 can be easily turned by the use of a screw driver working in the cross slot 27 of the plug, after loosening up the sleeve 14. The calibration of the device can easily be performed by inverting the cap 7 having applied thereto the signal device as a unit, and thereupon placing within the inverted cap and around the thermal element a liquid having the temperature at which it is desired for the device to give a signal. The plug 12 can then be turned to the exact point where the signal is just given which will represent substantially its proper position for giving the signal at the desired temperature.

As a matter of convenience in construction, the bell and other parts may be mounted within a case 28 which has the base flange 17 adapted to seat against the top surface of the radiator cap 7 either directly or through the medium of a companion collar 29. A neck 30 reaches downwardly from the base 17 through the cap 7, its exterior being threaded to receive a locking nut 31 on its under side. A lock washer 32 may be placed between the nut 31 and the under face of the cap, if desired. Furthermore, the nut 31 may be provided with a downwardly depending cylindrical flange 33 which is spaced away from the bracket member 11 a sufficient distance to allow easy circulation of liquids or vapors or air around the thermal element, the lower end of the member 33 being open in order to allow the same to enter and gain access to the thermal element.

While I have herein shown and described only a single embodiment of the features of my present invention, still I do not limit myself to the same except as I may do so in the claim.

I claim:

In a device of the class described, the combination of a casing adapted to be mounted on the filler cap of a radiator or the like, a clock work bell alarm within the casing including a striker normally operated by the clock work, a downwardly depending exteriorly threaded hollow neck on the casing adapted to reach through the filler cap, there being an internal circular recess in the lower portion of said neck, a spiral thermal element within the neck, a plug rotatably seated within the circular recess aforesaid, a rigid connection between the lower end of said thermal element and said plug, a rotatable shaft secured to the upper end of the thermal element and reaching upwards into the casing aforesaid, there being a transverse notch in the upper end of said shaft receiving the striker, the thermal element normally turning the shaft to thereby grip the striker and restrain the same from operation, and means for clamping the lower end of the neck for the purpose of clamping the plug against rotation therein, to thereby hold the plug in an adjusted position substantially as described.

OTTO RABE.